Jan. 2, 1968   J. A. G. RUSSELL ETAL   3,361,029
OPTICAL SCANNING BACKGROUND DENSITY NORMALIZER
Filed Nov. 26, 1963   2 Sheets-Sheet 1

INVENTORS
JEROME A. G. RUSSELL
FRANKLIN D. NEU
BY
ATTORNEY

United States Patent Office 3,361,029
Patented Jan. 2, 1968

3,361,029
OPTICAL SCANNING BACKGROUND DENSITY NORMALIZER
Jerome A. G. Russell, Danville, and Franklin D. Neu, Richmond, Calif., assignors to the United States of America as represented by the United States Atomic Energy Commission
Filed Nov. 26, 1963, Ser. No. 326,310
6 Claims. (Cl. 88—14)

ABSTRACT OF THE DISCLOSURE

This invention relates to a scanner for measuring co-ordinates of nuclear particle tracks on film, the scanner distinguishing the tracks from extraneous background patterns. A first phototube scans a minute area of film where a second phototube scans a larger concentric area thereof. A difference amplifier detects sharp changes in the amplitude ratio of the two output signals, as results from scanning across a track, and initiates recording the co-ordinate position thereof.

---

The present invention relates to optical scanning devices such as are used to measure the coordinates of nuclear particle tracks recorded on photographic films taken at a bubble chamber. More particularly the invention is a film scanning device which automatically compensates for extraneous variations in the film background to detect the true particle tracks more accurately. The invention described herein was made in the course of, or under, contract W-7405-eng-48 with the United States Atomic Energy Commission.

In typical film scanning equipment a single photomultiplier tube scans successive increments of the film and produces output signals, the successive amplitudes of which are proportional to the light transmissiveness of the film at the corresponding increments thereof. The information desired from the scanning is taken from these output signal amplitude levels. In general this information is the position of points on a particle track having a known degree of opacity on the film. Applying the output signals to appropriate amplitude descriminating circuitry will automatically select the desired meaningful output signals.

In some cases however the film pattern to be detected, such as the particle track, may not be of a predictable or consistent opacity with respect to the overall background light transmissiveness of the films and any one setting of the amplitude discrimination level will not reliably detect all the data of interest. In addition, very often the film is exposed under unfavorable conditions of photography and extreme variations in the background opacity of the film may be present. In these cases the amplitude discriminator cannot distinguish the continued high level signal response due to large areas of background pattern from the high level signal response due to the line pattern or track in the film.

These conditions cause particular difficulty in the scanning of films recording nuclear particle events within a bubble chamber. Bubble chamber films are exposed through a window in the chamber wall and reveal the paths and behavior of nuclear particles within the chamber. The particles, in passing through the superheated fluid in the chamber, create a track formed of minute bubbles and reactions between particular particles form characteristic track patterns by which the involved particles may be identified. These identifying patterns of interest however appear at random among a far greater proportion of traces of extraneous activity such as those of meaningless clusters of condensed bubbles arising from turbulence in the chamber or the spiral tracks of free electrons. Furthermore the background quality of these films is inherently varied. This is due in part to surface conditions of the bubble chamber window wherein the slightest trace of oily film on any portion thereof will produce dark shadows on the film. Some of this is due to irregular light distribution within the chamber itself, and many additional inconsistently occurring background variations are present but remain unexplained.

The above mentioned film conditions and the lack of automatic selective scanning techniques have theretofore required that all films be examined by a human observer to locate the meaningful track patterns among the various other film markings and shadows, and further, to distinguish among these selected patterns those which are pertinent to the particular matter being studied. Once located in this way, the desired patterns can be automatically measured and recorded by an optical scanning device in a succeeding operation.

In bubble chamber experimentation the chamber is photographed for each pulse of the particle accelerator beam, or, typically, ten times each minute. At this rate large quantities of film rapidly accumulate for examination. The examining process, if done manually, is tedious and time consuming, involving as much as twenty minutes viewing time for every significant event recorded. The present backlog of films to be processed and the increasing use of bubble chambers have made the need for more automatic examination techniques critical.

The present invention provides a film scanning device adaptable to the examination of such films which device facilitates automatic detection of the tracks and the subsequent selection of significant track patterns by computer mechanisms. By relating the light transmissiveness of a minute portion of film to that of a larger area immediately surrounding the minute portion it is possible for photoelectric scanning means to distinguish more readily between a genuine track and extraneous change in film opacity. To effect this result, a first photomultiplier tube acts as a track detector and scans the film through a minute viewing aperture. A second photomultiplier tube, acting as a background detector, simultaneously scans the film through a larger viewing aperture such that this photomultiplier tube sees a larger area which includes the minute area seen by the line detector. The gains of the two photomultiplier tubes are adjusted to the inverse proportion of the areas of the two viewing apertures whereby a uniform track-free image presented to each tube through the respective apertures will produce equal amplitude output signals therefrom. A difference amplifier is coupled to the outputs of the two photomultiplier tubes to subtract the background detector response from the line detector response to provide an output signal indicative of the contrast therebetween. This track-to-background contrast signal from the amplifier is a much more reliable means for initiating the recording of track coordinates than a signal obtained by a single phototube scanning mechanism.

Accordingly it is an object of the invention to provide a more reliable automatic means for distinguishing linear or curvilinear patterns on a film or the like which has areas of varying background opacity.

It is an object of the present invention to facilitate the analysis of experimental data in the field of nuclear physics.

It is another object of the invention to provide an improved means for scanning photographic film to detect nuclear particle tracks recorded thereon.

It is still another object of this invention to provide an optical scanning apparatus which is selectively responsive to line or curve patterns recorded on photographic film.

It is a further object of the invention to provide a means for automatically compensating for opacity variations in the background of photographic films being scanned whereby such variations do not result in erroneous data.

The invention, both as to its organization and method of operation, together with further objects and advantages thereof, will be best understood with reference to the following specification taken in conjunction with the accompanying drawing of which:

Figure 1:
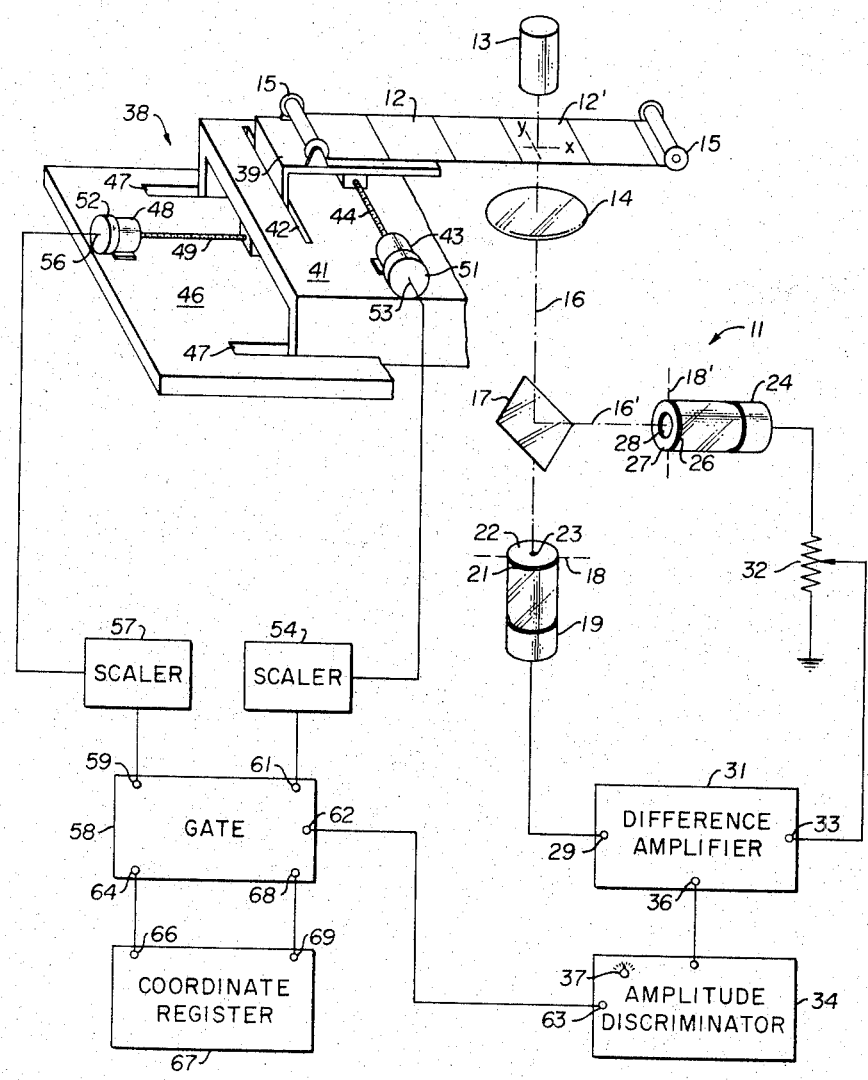
FIGURE 1 is a schematic view of the apparatus.

Referring now to the drawing and more particularly to FIGURE 1 thereof there is shown the optical arrangement of the detecting head 11 of the apparatus. To project an image of the film 12 for scanning, the film strip is disposed between a light source 13 and an objective lens 14. The film strip 12 is supported thereat between two film spools 15 with the particular film frame 12' to be scanned positioned at the optical axis 16 formed by the light source 13 and the lens 14. In order to provide two identical images of the film 12, a half-silvered mirror 17 intercepts the projection of the film. The mirror 17 is centerd on the optical axis 16 at a point thereon within the focal length of lens 14. The mirror 17 is disposed in a plane at 45° to the axis 16 with the reflective surface of the mirror essentially facing the lens 14 whereby the optical axis of reflection 16' is established at right angles to axis 16. Thus, a first image of the film, transmitted by the mirror 17, is established at the focal plane 18 of the lens 14 and a second image, reflected by the mirror, is established at the reflected focal plane 18' of the lens.

A first photomultiplier tube 19 is disposed with the end window 21 thereof in the focal plane 18 to view the transmitted image of the film 12. A circular opaque plate 22, provided with a central aperture 23, abuts the end window 21, which aperture 23 determines the size of the area of the film image scanned by the tube 19. The diameter of aperture 23 is made equal to the average width of the track lines being sought in the film 12, whereby photomultiplier tube 19 acts as the line scanning detector. A second, similar photomultiplier tube 24 is disposed with the end window 26 thereof in focal plane 18' to view the reflected image of the film 12. A second opaque plate 27 having a central aperture 28 abuts end window 26 of photomultiplier tube 24. In this embodiment of the invention the area of the aperture 28 in plate 27 is made to be ten times that of aperture 23 in plate 22, whereby second photomultiplier tube acts as the background scanning detector. It should be noted however that the area of the background scanning aperture 28 may be varied relative to the line scanning aperture 23 as long as a gain adjustment is made as will hereinafter be described. The two photomultiplier tubes 19 and 24 are positioned in the respective focal planes 18 and 18' at the same relative locations thereon such that the viewing apertures 23 and 28 associated therewith see concentric areas of the two identical film images.

The output of the first photomultiplier tube 19 is coupled directly to a first input 29 of a difference amplifier 31. The output of second photomultiplier tube 24 is coupled through a gain adjusting potentiometer 32 to a second input 33 of difference amplifier 31. The gain of the background detector tube 24 is adjusted in potentiometer 32 such that an image of uniform opacity presented to both photomultiplier tubes 19 and 24, through the respective apertures 23 and 28, will produce equal amplitude output signals therefrom. Alternately, it can be seen that the gain adjustment could be associated with the line detector tube 19 in which case the tube response would be amplified to equal that of the larger apertured tube 24. In either case, the response levels of the two photomultiplier tubes 19 and 24 are adjusted to essentially the inverse ratio of the areas of the respective apertures 23 and 28.

The differential amplifier 31 simultaneously receives the output signals from the two photomultiplier tubes 19 and 24 and subtracts the response of the background detector tube 24 from that of the line detector tube 19. Thus, since the film density of the background scanning element is subtracted from the density of the line scanning element superimposed thereon, the amplifier 31 output signal will have a fairly constant zero reference level corresponding to a normalized film background density. Detected track markings in the film, wherein the signal of the line scanning detector 19 is substantially greater than that of the background scanning detector 24, will appear as a discrete signal level rising from the zero reference level in the output of amplifier 31. An amplitude discriminator 34 is coupled to the output 36 of difference amplifier 31 to detect output signals therefrom which have an amplitude above a certain discrimination level. This level is predetermined as the necessary degree of film opacity contrast for a detectable track and is set on the discriminator 34 by a discrimination adjust knob 37. With the difference amplifier 31 output maintaining the more constant zero reference level, the amplitude setting of the discriminator 34 may remain fixed for the entire scanning operation for which the particular amplitude criteria applies. In the conventional single detector scanning operations this setting required continuous adjustment to accommodate for variations in the input signal reference level, due to variations in the background density of the film.

The scanning motion for simultaneously traversing the areas of the two images of film 12 with the two detector tubes 19 and 24 may be affected by various means well known in the art, such means imparting movement to the film sheet 12 while the detectors remain stationary, or the converse arrangement, in which latter case the detectors and the mirror 17 would be preferably mounted on a single carriage to maintain their proper spatial relationship to each other. One such means of translating the film 12 with respect to the optical axis 16 of the detecting head 11 is indicated schematically in FIGURE 1 and comprises a two-stage movable platform film support 38. The two film spools 15 are spaced apart and mounted on a first platform 39. The platform 39 is disposed on a second larger platform 41 and is movable in a first direction thereon by traveling in ways 42 provided on the platform 41. A first reversible motor 43, mounted on platform 41, is coupled to platform 39 by a lead screw 44 whereby rotation of the motor 43 translates the film 12 in the first direction. The second platform 41 is disposed on a larger stationary base plate 46 and is movable thereon in a second, transverse direction by traveling in ways 47 provided on the base plate. A second reversible motor 48, mounted on base plate 46, is coupled to platform 41 by lead screw 49 whereby rotation of the motor 48 translates the film 12 in the second orthogonal direction.

Thus the reversible rotation of motor 48 allows the film strip 12 to be translated back and forth longitudinally, which direction is chosen to correspond to the x-coordinate positioning of the film, and, the reversible rotation of motor 43 allows the film to be shifted transversely, which direction is chosen to correspond to the y-coordinate positioning of the film. In this way, by initially positioning a leading corner of the particular film frame 12' which is to be scanned at the optical axis 16, the frame may be traversed along the x-coordinate direction and advanced in the y-coordinate direction to cause each succeeding traverse to be closely adjacent to the previous one and thereby effect a complete incrementalized scanning of the film.

To identify the separate successive increments of the film frame 12' being scanned, which increments are chosen to be roughly equal in area to that of aperture 23 of the line detector tube 19, each of the motors 43 and 48 has a separate rotary-to-digital converter 51 and 52, respectively, attached thereto. The converters produce an electrical pulse upon each small increment of revolution of the motor. The output 53 of converter 51 is coupled to a first scaler 54 and the output 56 of converter 52 is coupled to a second scaler 57. The scalers 54 and 57 count the respective input pulses from the converters 51 and 52 and upon being gated "on" produce an output indicative of the instantaneous positions of the stages.

A gate circuit 58 has a first input channel 59 coupled to scaler 57 and a second input channel 61 coupled to scaler 54. A third gating signal input 62 to the gate 58 is coupled to the output 63 of amplitude discriminator 34 of the detecting head 11 circuit. The gate 58 is of the type requiring the presence of a signal at third input 62 in order to transmit the respective signals at inputs 59 and 61 to the output. A first output 64 of the gate 58 is connected to the x-coordinate input terminal 66 of a coordinate register 67, and a second output 68 of the gate is connected to the y-coordinate input terminal 69 of the register 67. Thus, upon the detection of a track marking during the scanning motion, the occurrence of the track discriminating signal at gate input 62 opens the gate 58 to transmit the respective scanning location signals from scalers 57 and 54 to the coordinate register 67, whereby the location is recorded. The register 67 may variously be a card punch device or magnetic tape system, etc., in accordance with the particular data handling method of the subsequent track computation, suitable systems being well understood within the art.

Figure 2:
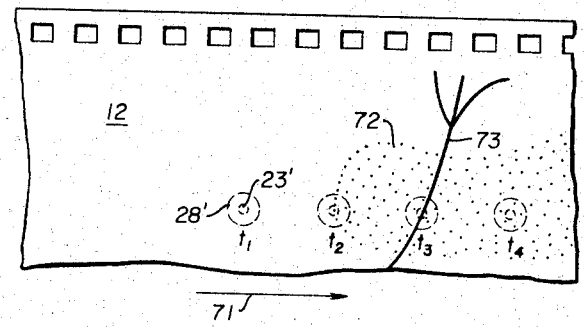
FIGURE 2 shows a typical section of film to be scanned.
Figure 3:
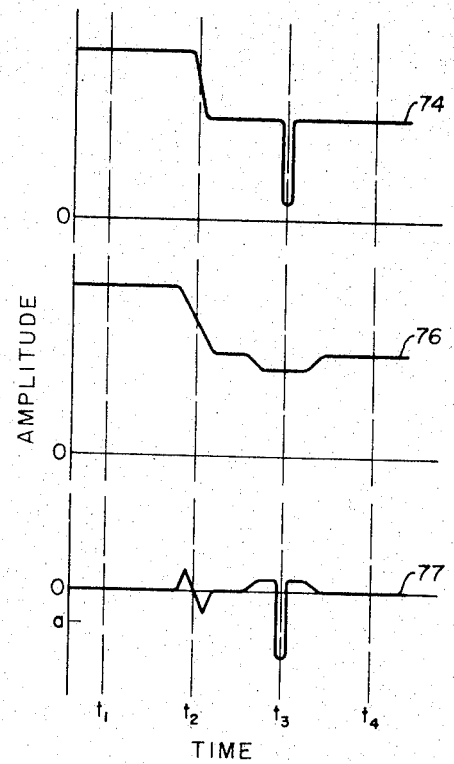
FIGURE 3 is a graphical illustration of signals produced by certain of the components of the circuitry of FIGURE 1 upon scanning the film section shown in FIGURE 2.

Referring now to FIGURES 2 and 3 as well as FIGURE 1 for an understanding of the operation of the invention, there is shown in FIGURE 2 a typical section of the film 12 to be scanned. The concentric areas 23' and 28' viewed by the line detector tube 19 and background detector tube 24, respectively, are shown (by arrow 71) to be moved laterally with respect to the film section 12, comparable to the translation of the film along the x-coordinate direction by the movable film platform 38. The film section 12 contains a typical film opacity variation 72 shown by the shaded area with a darker particle track 73 passing therethrough. The variation in output current response of the two photomultiplier tubes 19 and 24 while crossing the area 72 is shown in curves 74 and 76 respectively of FIGURE 3. The subsequent output of the difference amplifier is shown in curve 77. The three curves 74, 76 and 77 are related to a common time-amplitude scale.

In the initial scanning position the viewing apertures 23' and 28' view a clear, highly transmissive portion of the film 12, as shown in phantom in FIGURE 2 at time $t_1$. Due to the gain adjustment of the background detector tube 24, the respective output curves 74 and 76 of both tubes 19 and 24 show the same high amplitude response to this uniform image. The difference amplifier 31, in response to these equal amplitude signals shows a zero amplitude output level in the amplifier output curve 77. As the scanning motion moves the shaded region 72 onto the viewing apertures 23' and 28' at time $t_2$, the larger aperture 28' enters the shading 72 first. As the aperture area 28' becomes increasingly faced by the shaded portion, the output response curve 76 corresponding thereto is seen to gradually fall. When the small aperture 23' enters the shaded portion 72 the total aperture area is more rapidly faced by the shading and thus the corresponding response curve 74 falls more sharply. Again, due to the gain adjustment of tube 24, both signals fall to the same amplitude level when completely faced by the shading 72. The difference amplifier, subtracting the background detector response from the line detector response shows a resultant rise and dip in the output curve 77.

At time $t_3$ when the scanning has moved to the track 73 the track will completely cover the small aperture area 23', while it occupies only a small percentage of the larger aperture area 28'. Accordingly, the output of the line detector tube 19 in curve 74 shows an immediate, severe amplitude drop while the track is at aperture area 23. The output of the background detector tube 24 in curve 76, however, shows a gradual, small amplitude change while the track 73 is moved across the larger aperture area 28'. Thus, the negative peak of the difference amplifier 31 output signal is seen in curve 77 to be changed only slightly by the subtracted background response.

Upon passing the track 73, such as at time $t_4$ where both the viewing aperture areas 23' and 28' are again faced with the essentially uniform shaded portion 72 of the film, the respective detector output signals 74 and 76 thereof are again of equal amplitude whereby the difference amplifier 31 output 77 returns to the zero amplitude reference level.

Thus the detected track markings appear as discrete, large amplitude signals in the amplifier 31 output, which signals rise from a substantially constant zero reference level regardless of the film background density. The amplitude discriminator 34 receiving the difference amplifier 31 output may thereby operate at a fixed discrimination level, such as amplitude $a$ of curve 77, to identify those signals therein indicative of detected tracks. At time $t_3$ when this condition is met, the consequent output signal from the discriminator 34 is received by the gate 58 and the corresponding x and y coordinate positions on the film are recorded in register 67.

While the invention has been described with respect to a single preferred embodiment thereof, it will be apparent to those skilled in the art that numerous variations and modifications are possible within the spirit and scope of the invention and it is not intended to limit the invention except as defined in the following claims.

What is claimed is:

1. In apparatus for optically scanning a film or the like to detect markings thereon, the combination comprising:
    (a) a first photosensitive device positioned to view a first area in the plane of said film, said first area being of diameter substantially equal to the width of said markings,
    (b) a second photosensitive device positioned to view a second area in the plane of said film which second area is of substantially greater diameter than said first area and which concentrically includes said first area,
    (c) means adjusting the relative response of said first and said second photosensitive devices to the inverse proportion of said first and said second areas respectively viewed thereby,
    (d) a difference amplifier having first and second inputs connected to said first and second photosensitive devices and producing an output signal proportional to the amplitude difference between the input signals from said photosensitive devices,
    (e) a discriminator circuit coupled to the output of said difference amplifier and producing a signal upon receipt of an input signal from said difference amplifier which differs from the normal level thereof,
    (f) means for translating said film in a scanning pattern within said plane whereby said discriminator produces an output signal upon passage of said markings across said first viewing area, and means registering the instantaneous position of said film in said scanning pattern upon occurrence of said discriminator signal.

2. A scanning device for detecting data on photographic film transparencies comprising:
    (a) a film holder supporting said film to be scanned,
    (b) projector means for producing two separate and similar images of said film transparency,
    (c) a first and a second phototube, each of said phototubes disposed with the photosensitive surface thereof in the plane of a separate one of said film images and at corresponding locations with respect thereto,
    (d) a first opaque plate superimposed on the photosensitive surface of said first phototube, said plate having a central aperture provided therein to transmit a minute portion of said projected film image, (e) a second opaque plate superimposed on the photosensitive surface of said second phototube, said second plate having a central aperture provided therein of diameter substantially greater than that of the aperture in said first plate, and which includes the corresponding portion of the image area viewed by said first phototube as a central portion thereof, (f) means adjusting the relative light sensitivity of said first and second phototubes to the inverse ratio of the aperture areas in said first and second opaque plates respectively associated therewith, (g) an amplifier having first and second inputs respectively coupled to said first and second phototubes and producing an output signal in proportion to the amplitude difference between simultaneous input signals thereto, (h) an amplitude discriminator circuit connected to the output of said amplifier and producing a signal upon receipt of an input signal therefrom which differs from the normal amplitude level thereof, and (i) means translating said film holder in the plane of said film whereby said discriminator circuit produces output signals upon the passage of markings in the image of said film across the aperture in said plate associated with said first phototube.

3. A scanning device as described in claim 2 wherein said projector means comprises:

(a) a light source disposed on one side of the plane of said film, (b) a lens disposed on the opposite side of said film from said light source and focussing the image of said film transparency projected thereby, and (c) a half-silvered mirror disposed along the optical axis between said lens and the focal plane thereof with the half-silvered surface facing said lens at an oblique angle therewith thereby producing a first, transmitted image of said film and a second, reflected image of said film.

4. In an optical scanning device for use with photographic film to detect essentially linear or curvilinear markings recorded thereon, the combination comprising:

(a) a film holder, (b) an image projector including a light source and focussing lens disposed with respect to said film holder to produce an image of said film, (c) a half-silvered mirror disposed obliquely in the path of said image to produce two separated and similar images of marking patterns recorded on said film pattern, (d) a first phototube positioned to view a first area in the plane of one of said images, (e) a second phototube positioned to view a second area in the plane of the other of said images, said second area being of diameter substantially greater than said first area and including as the central part thereof the portion corresponding to said first area in the plane of said first image, (f) potentiometer means adjusting the relative response of said first and second phototubes to the inverse proportion of said first and second areas respectively viewed thereby, (g) a difference amplifier having first and second inputs connected to said first and second phototubes and producing output signals proportional to the amplitude difference between simultaneous input signals thereto, (h) an amplitude discriminator coupled to the output of said difference amplifier and producing an output signal upon receipt of an input signal thereto which differs from a predetermined amplitude level, (i) a first movable carriage supporting said film holder and adapted to translate said film in a first direction, (j) a second movable carriage supporting said film holder and adapted to advance said film in a second orthogonal direction upon each translation of said film in said first direction, drive means coupled to said first and second movable carriages for imparting said respective movements thereto, (k) scaler circuit means coupled to said first and said second movable carriages and recording the travel of said film holder in each of said orthogonal directions, (l) a co-ordinate recording device, and (m) a gate circuit having a first input coupled to said scaler circuit and a second input coupled to the output of said amplitude discriminator and having an output coupled to said recording device whereby the instantaneous position of said film holder is recorded upon the passage of said markings across said first viewing area.

5. Apparatus as described in claim 4 wherein said amplitude discriminator is provided with an adjustable amplitude discrimination level of the input signals thereto to accommodate for different background opacities between separate films to be scanned.

6. Apparatus as described in claim 4 wherein said recording device is an $x$- and $y$-coordinate register.

References Cited

Andrew et al., Installation for Automatic Measuring of Photographs From Bubble Chambers, International Conf. on High Energy Accel. and Inst., CERN, 1959, pp. 541–543.

Nikitin S. Ya., Modern Methods of Evaluation of Bubble Chamber Photographs, Instruments and Experimental Techniques, 1961, pp. 219–226.

JEWELL H. PEDERSEN, *Primary Examiner.*

A. A. KASHINSKI, *Assistant Examiner.*